United States Patent
Camurdan et al.

(10) Patent No.: US 12,320,437 B2
(45) Date of Patent: Jun. 3, 2025

(54) PRESSURE RELIEF VALVE ASSEMBLY, MODULAR PRESSURE RELIEF VALVE ASSEMBLY, AND HYDRAULIC CONTROL ASSEMBLY HAVING SUCH A PRESSURE RELIEF VALVE ASSEMBLY

(71) Applicant: Robert Bosch GmbH, Stuttgart (DE)

(72) Inventors: Hakan Camurdan, Neu-Ulm (DE); Karthikeyan Maharajan, Tamil Nadu (IN)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 18/458,366

(22) Filed: Aug. 30, 2023

(65) Prior Publication Data
US 2024/0110633 A1    Apr. 4, 2024

(30) Foreign Application Priority Data
Oct. 4, 2022 (DE) .................. 10 2022 210 469.2

(51) Int. Cl.
*F16K 17/04* (2006.01)
*F15B 13/02* (2006.01)
(Continued)

(52) U.S. Cl.
CPC .......... *F16K 17/048* (2013.01); *F15B 13/024* (2013.01); *F15B 13/0401* (2013.01);
(Continued)

(58) Field of Classification Search
CPC .... F16K 15/1826; F16K 17/048; F16K 17/06; F16K 17/105; F15B 13/0401;
(Continued)

(56) References Cited

U.S. PATENT DOCUMENTS

| | | | |
|---|---|---|---|
| 6,488,258 B1 * | 12/2002 | Dantlgraber | F15B 13/01 251/63.6 |
| 2014/0034159 A1 * | 2/2014 | Myrhum, Jr. | F15B 13/024 137/561 R |
| 2019/0360603 A1 * | 11/2019 | Katoh | F16K 17/02 |

FOREIGN PATENT DOCUMENTS

| | | |
|---|---|---|
| DE | 10 2004 057 740 A1 | 6/2006 |
| DE | 10 2011 121 052 A1 | 6/2013 |

OTHER PUBLICATIONS

Bosch-Rexroth AG, "Proportional pressure reducing valve, direct operated, increasing characteristic curve FTDRE 2 K" Data Sheet RE 58032/2022-02-02, Feb. 2022, Lohr am Main, DE (12 pages).

* cited by examiner

*Primary Examiner* — Atif H Chaudry
(74) *Attorney, Agent, or Firm* — Maginot, Moore & Beck LLP (57) ABSTRACT

A pressure relief valve assembly includes a pressure relief valve having a valve bushing received in a valve bore of a housing bore, and a valve body biased against a valve seat by a spring guided in the valve bushing. The valve body includes first and second control surfaces subjected in an opening direction, respectively, to a pressure to be limited and to a control pressure. A fixing device disposed on the valve bushing axially supports the valve bushing in the housing bore. The valve bushing has a radially protruding sealing collar which sits against a peripheral wall of the housing bore and seals an annular chamber carrying the pressure to be limited against an annular control chamber carrying the control pressure. Both the chamber and the control chamber are radially delimited on one side by the housing bore and on the other side by the valve body.

15 Claims, 4 Drawing Sheets

(51) Int. Cl.
  *F15B 13/04* (2006.01)
  *F16K 15/18* (2006.01)
  *F16K 17/06* (2006.01)
  *F16K 17/10* (2006.01)
(52) U.S. Cl.
  CPC .......... *F16K 15/1826* (2021.08); *F16K 17/06* (2013.01); *F16K 17/105* (2013.01); *F16K 2200/501* (2021.08)
(58) Field of Classification Search
  CPC .. F15B 2211/50518; F15B 2211/50527; F15B 2211/50554
  See application file for complete search history.

PRESSURE RELIEF VALVE ASSEMBLY, MODULAR PRESSURE RELIEF VALVE ASSEMBLY, AND HYDRAULIC CONTROL ASSEMBLY HAVING SUCH A PRESSURE RELIEF VALVE ASSEMBLY

This application claims priority under 35 U.S.C. § 119 to application no. DE 10 2022 210 469.2, filed on Oct. 4, 2022 in Germany, the disclosure of which is incorporated herein by reference in its entirety.

The disclosure relates to a pressure relief valve assembly, a modular pressure relief valve assembly optionally designed to include an adjustable or non-adjustable pressure relief valve, and a hydraulic control assembly having such pressure relief valve assemblies.

BACKGROUND

Generic pressure relieve valve assemblies are well known, for example from publication DE 10 2011 121 052 A1. This document discloses a hydraulic control assembly having an adjustable axial piston pump for supplying a pressure medium to a hydraulic end user. The axial piston engine is part of a feed pump for conveying the pressure medium to a low-pressure working line of the closed hydraulic circuit such that a feed pressure equal to the feed pressure of the feed pump is in effect in the working line. In this known solution, in order to limit the feed pressure, a pressure relief valve is provided which is biased to a closed position via a spring and is subject to the feed pressure in the opening direction such that the pressure relief valve opens when the feed pressure is equal to the pressure equivalent of the spring. For example, this opening pressure is set to approximately 20 to 30 bar so that the feed pressure is limited accordingly. When the pressure relief valve is open, a pressure medium connection to the tank T is then established so that the maximum feed pressure is not exceeded.

If the hydraulic end users are not under load, and the axial piston pump is in idle mode as a result, the feed pressure required to operate the pump is substantially lower, for example it can be 10 bar. However, the feed pressure cannot be limited to this value because conventional pressure relief valves are set to the higher pressure (for example 30 bar) via the spring. In order to overcome this disadvantage, in DE 10 2011 121 052 A1 it is proposed that a second control surface be provided on a valve body of the pressure relief valve, and that in order to reduce the feed pressure this surface be subject to a control pressure so that the pressure relief valve opens, for example when the axial piston pump is idled as described above, at a significantly lower pressure, for example 10 bar. The axial piston pump can thus be operated at the minimum feed pressure such that an energy savings can be achieved with very little device design effort. The pressurization of the further control surface can take place in accordance with DE 10 2011 121 052 A1, for example via a switching valve or a pressure-reducing valve. In the latter case, the pressure acting on the second control surface can be adjusted by controlling the pressure-reducing valve accordingly, so that the lower feed pressure can also be variably adjusted accordingly. In this solution, the pressure-reducing valve, and its outlet-side pressure channel, is integrated into the housing of the pressure relief valve assembly such that significant device design effort is required.

DE 10 2004 057 740 A1 shows a solution in which the reduction of the feed pressure is achieved using a valve assembly which allows the feed line to be connected to the suction side of the feed pump in order to reduce the feed pressure.

These valve assemblies for lowering feed pressure have a comparatively complex design.

SUMMARY

In contrast, the object of the disclosure is to create a pressure relief valve assembly and a hydraulic control assembly having such a valve assembly in which the feed pressure reduction is flexibly achievable with little device design effort.

With regard to the pressure relief valve assembly and the hydraulic control assembly, this task is achieved by the features of disclosed below. Solving the task also involves a modular pressure relief valve assembly that allows for a flexible configuration of the pressure relief valve assembly to include a constant spring biasing or a variable spring biasing.

The pressure relief valve assembly according to the present disclosure has a pressure relief valve having a valve bushing accommodated in a valve bore of a housing bore, a valve piston being guided in the bushing and being biased by a spring against a valve seat. In the process, a first control surface subject to the pressure to be limited in the opening direction is designed on the valve seat, as is a second control surface which is likewise subject to a control pressure or a tank pressure in the opening direction. The axial fixing of the valve bushing in the housing bore is achieved by a fixing device arranged on the valve bushing, the fixing device preferably being designed with a threaded portion. According to the disclosure, the valve bushing has a radially protruding sealing collar which sits sealingly against the peripheral wall of the housing bore in a sealed fit and which seals an annular control chamber carrying the pressure to be limited, wherein both chambers (annular chamber, control chamber) are delimited in the radial direction, at least in sections, on one side by the peripheral wall of the housing bore and on the other side by the outer circumference of the valve body.

By appropriate configuration of the valve body, the two control surfaces of the pressure relief valve, which act in the opening direction, can be designed in a very simple manner and can be adapted to different pressure levels.

In the modular pressure relief valve assembly, the pressure relief valve is designed similarly, however the pressure relief valve may optionally be designed with a constant spring bias or with a variable spring bias, wherein essentially only the basic structure of the valve bushing must be changed. In the constant spring bias variant, an integral valve bushing is provided, which is screwed into the housing in a conventional manner, wherein the spring bias remains constant. The valve bushing is guided axially-slidably inside the housing bore so as to variably adjust the feed pressure, wherein fixing the axial position is achieved by screwing the valve bushing into a threaded bushing placed in the housing bore. The variable spring bias may in this case be adjusted by screwing the valve bushing into the threaded bushing to a greater or lesser degree such that the axial position of the valve bushing within the housing bore changes accordingly, and thus also the spring bias. The other components of the pressure relief valve assembly, for example the valve body, the spring assembly (spring and spring retainer), and the housing bore are identical in both applications (pressure relief valve with constant spring bias or with variable spring bias), such that two different design types can be realized merely by changing the valve bushing.

Accordingly, the hydraulic control assembly according to the disclosure is arranged with such a pressure relief valve assembly, which, for example, is constructed by a suitable selection of the modular pressure relief valve assembly components.

In an exemplary embodiment of the disclosure, the pressure relief valve assembly is designed such that the above-mentioned control chamber is in pressure communication with a control chamber which is located at a distance away from the valve seat and is delimited by the second control surface, wherein the first control surface is preferably formed by an annular end surface of the valve body.

According to the present disclosure, it is particularly preferred for an annular groove to be formed on the valve body, the lateral surfaces of the groove, which are designed to have the same end surface area, being subjected to the pressure to be limited, wherein an annular control chamber delimited by the first control surface is connected to the annular groove via a cut-out, in particular a flattened section of the valve body. In this way, guiding the control oil inside the pressure relief valve assembly is possible with very little device design effort.

The design can be further simplified if the valve bushing has a further, radially protruding annular collar which sits sealingly against the peripheral wall of the housing bore and on which the valve seat for the valve body is preferably formed.

The seal between the sealing collar and the annular collar and the peripheral wall of the housing bore that respectively surrounds each is preferably carried out via metallic sealing surfaces and/or via a sealing element, for example sealing rings arranged along the sliding guide of the sealing collar and the annular collar.

The adjustment of the control pressure acting on the second control surface is particularly simple and flexible using a pressure valve, preferably a pressure-reducing valve. However, in the case of simpler solutions, instead of such a pressure valve, a switching valve can also be provided for switching on a constant control pressure. This pressure-reducing valve can, for example, be designed as disclosed in the data sheet RD 58032/2022-02-02 of Bosch Rexroth AG.

As discussed above, the valve bushing may be guided axially movably inside the sliding guide for adjusting the spring bias.

This is particularly easily done if the fixing device is designed with a threaded bushing fixed in the housing bore, the bushing having a threaded engagement with the axially movably-guided valve bushing such that by correspondingly rotating the valve bushing, its axial position and thus the bias of the spring can be changed.

This adjustment is particularly simple if an adjusting portion of the valve bushing sealingly penetrates the threaded bushing and is accessible from outside by protruding outward therefrom.

BRIEF DESCRIPTION OF THE DRAWINGS

Preferred exemplary embodiments of the disclosure are described in greater detail below, with reference to the accompanying drawings. The figures show.

DETAILED DESCRIPTION

Figure 1:
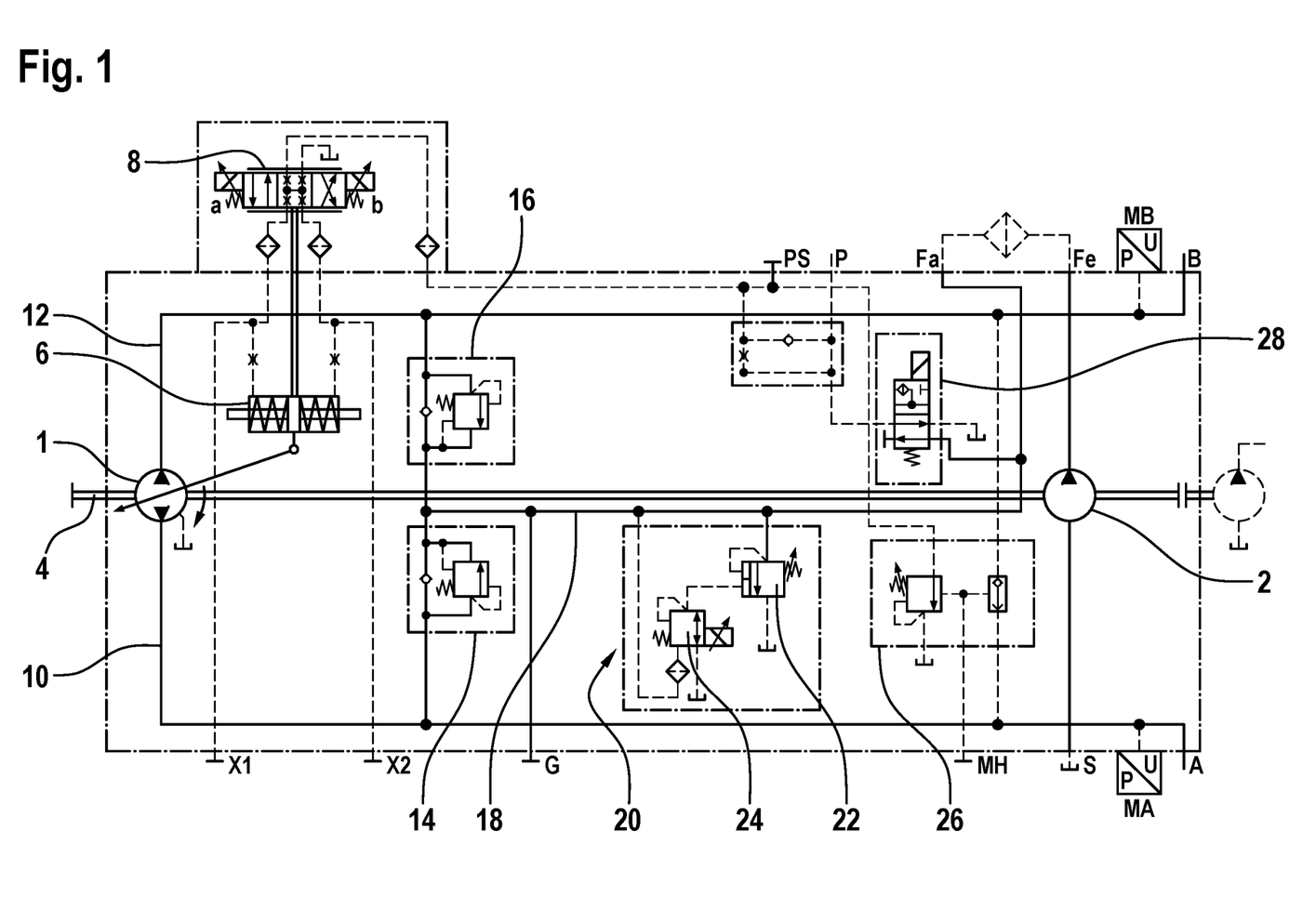
In FIG. 1 a circuit diagram of a hydraulic control assembly according to the present disclosure, the assembly having a pressure relief valve assembly according to the present disclosure.

FIG. 1 shows a circuit diagram of a hydraulic control assembly having an axial piston pump 1. For example, this pump, together with a feed pump 2, is driven by an internal combustion engine via a drive shaft 4. The axial piston pump 1 is designed to be displaceable in a known manner, wherein a swashplate is movable via a double-acting displacement cylinder 6. This cylinder is actuated via a proportionally-adjustable displacement valve 8 which is supplied with pressure medium via the feed pump 2. The two ports of the axial piston pump 1 are connected to working ports A, B via working lines 10, 12 which supply the pressure medium to a connected end user. The pressure in the working lines 10, 12 is limited by primary pressure relief valves 14, 16, which are designed with an anti-cavitation function. Here, the anti-cavitation function of check valves is put to use, enabling the pressure medium to be conveyed from a feed pump which is connected to feed pump 2 to the respective low-pressure region.

The feed pressure in the feed line 18 may be limited by a pressure relief valve assembly 20 according to the present disclosure. This assembly has a pressure relief valve 22 and a pressure-reducing valve 24, wherein the latter is able to subject the pressure relief valve 22 to a control pressure. The design of the pressure relief valve assembly 20 is explained below with the aid of FIGS. 2 through 6.

Reference sign 26 denotes a pressure cut-off valve in FIG. 1. Pressure medium is supplied to the proportional valve 8 by a switching valve 28 which is switched over to a supply of pressure medium to the actuator cylinder 6. Since the basic design of this control assembly is known—except for the design of the pressure relief valve assembly 20—further description of the individual components can be omitted by reference to the prior art described above.

Figure 2:
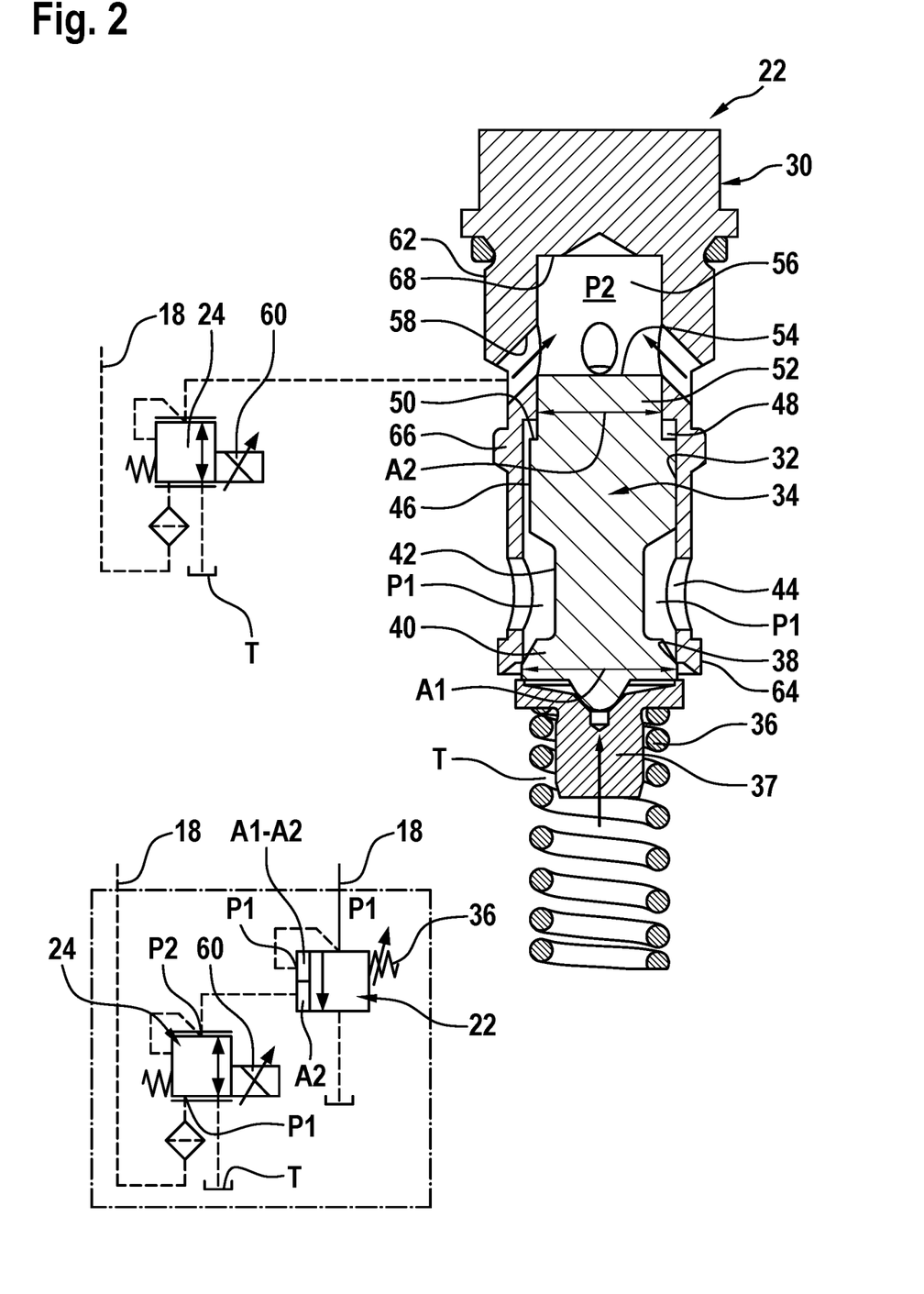
In FIG. 2 a cross-sectional view of a pressure relief valve of the pressure relief valve assembly according to FIG. 1.

FIG. 2 explains the basic structure of the cartridge-shaped pressure relief valve 22 of the pressure relief valve assembly 20 according to FIG. 1. According to the figure, the valve comprises a valve bushing 30, which is inserted into a housing bore of a valve housing, as will be explained in further detail below. A valve body 34 which may move axially is guided inside of a stepped valve bore 32, the valve body being biased by a spring 36 against an end valve seat 38 in the opening region of the valve bore 32. The spring 36 engages a valve cone 40 using a spring retainer 37, the cone partially protruding out from the valve bore 32, the tapered conical surfaces of the cone sealingly sitting against the valve seat 38 in the closed position shown. Connected to the valve cone 40 is the valve body 34, which comprises an annular groove 42 such that, together with the inner peripheral surface of the valve bore 32, an annular chamber is formed into which a radial bore 44 of the valve bushing 30 opens. The feed pressure P1 of the feed pump 2 is in effect at this radial bore 44. The annular end surfaces of the annular groove 42 are preferably designed with the same end surface area, which is characterized by the surface area A1 in FIG. 2. In the area of the annular groove 42, the pressure forces resulting from pressure P1 are balanced as a result.

In the exemplary embodiment according to FIG. 2, a flattened section 46 is formed on the outer circumference of the valve body 34 so that a connecting channel is created between the inner peripheral wall of the valve bore 32 and the flattened section 46, the connecting channel connecting an annular control chamber 48 to the space which is delimited by the annular groove 42 and which is subject to the feed pressure P1. This annular control chamber 48 is partially delimited by an annular end surface 50 formed by a stepping back of the valve body 34. In this area, the valve bore 32 is stepped back such that the upper end section 52 of the valve body 34 shown in FIG. 2 plunges into this stepped-back portion of the valve bore 32, the end surface 54 of the end section plunging into a rear control chamber 56. In the illustration according to FIG. 2, this chamber is delimited on the top by a bottom 68 of the valve bore 32. This control chamber 56 is connected to a control line by way of oblique radial channels 58 made in the valve bushing 30, the control line being connected to the outlet of the pressure-reducing valve 24. Accordingly, the outlet pressure P2 of this pressure-reducing valve 24 is in effect in the control chamber 56 such that the end surface 54 of the end section 52 of the valve body 34, the end surface having the surface area A2, is subject to this outlet pressure P2.

This is also shown in the substituted graphic of the pressure relief valve assembly 20, which is copied into FIG. 2. The pressure relief valve 22 is shown in this substituted graphic, together with its pressure port P, the feed pressure P1 being in effect at this port in the representation according to FIG. 2. This feed pressure also acts on the annular end surface 50, the surface area of which corresponds to the valve seat surface area A1 minus the surface area A2 of the rear end surface 54 (area difference A1-A2). The volumetric flow flowing into the annular control chamber 48 through the flattened section 46 and acting on the annular end surface 50 generates dampening of the pressure relief valve assembly 20. The stepped-back end surface 54 of the valve body 34 acts in the same direction as that according to the substituted graphic. This end surface 54, which has the surface area A2, is subject to the outlet pressure P2 of the pressure-reducing valve 24 (see substituted graphic). The pressure-reducing valve is biased by a spring to the base position shown in which the outlet port is connected to the tank port T. A pressure medium connection of the outlet port of the pressure-reducing valve 24 to the pressure port at which the feed pressure P1 is in effect can then be effected by energizing a proportional solenoid 60. Accordingly, by actuating this proportional solenoid 60, the end surface 54 having the surface area A2 can be subjected to a pressure in a pressure range bounded on one side by the tank pressure T and by the feed pressure P1 on the other side. This will be explained in more detail below.

In the exemplary embodiment shown in FIG. 2, the upper end section of the valve bushing 30 is designed with an external threading 62 for screwing the valve bushing 30 into the housing. Formed on the outer circumference of the valve bushing 30 radially recessed relative to the outer threading 62 are an annular collar 64 on the valve seat side and a sealing collar 66, the collars sealingly sitting against the inner peripheral surface of the housing bore (see FIG. 3) in a sealing type of fit.

Figure 3:
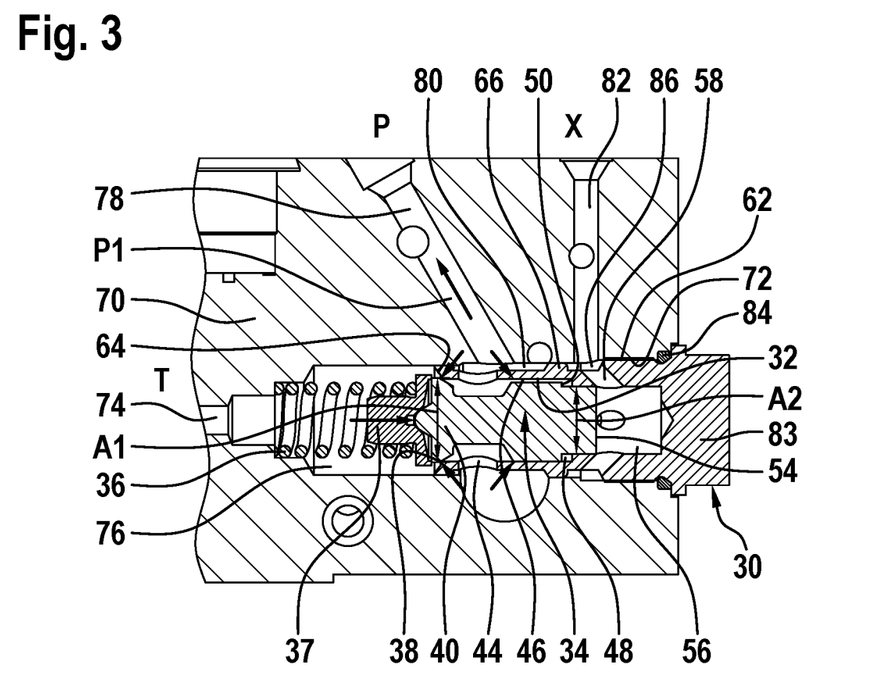
In FIG. 3 the pressure relief valve according to FIG. 2 in the installed state, wherein the preset maximum feed pressure has not yet been reached.

FIG. 3 shows the pressure relief valve 22 according to FIG. 2 in the installed state. What is shown is a part of a housing 70 of the axial piston pump 1 or of a valve assembly in which a housing bore 72 is arranged for receiving the pressure relief valve 22, which is in the shape of a cartridge. The housing 70 has a tank port T, a pressure port P subject to the feed pressure, and a control port X connected to the outlet port A of pressure-reducing valve 24. Through a tank channel 74, the tank port T is connected to a spring chamber 76 in which spring 36 is received. On the tank channel side, this spring is supported on a radial step of the spring chamber 76 and engages the valve body 34 via the spring retainer 37 so that the valve cone 40 of the valve body is biased against the valve seat 38 of the valve bushing 30. Accordingly, the valve body 34 is biased in the closing direction by the force of the spring 36 and by the force resulting from the tank pressure acting on the surface area A1 of the valve seat 38.

As discussed above, the sealing collar 66 and the annular collar 64 on the valve seat side sealingly sit against the inner peripheral surface of the housing bore 72. As stated, this sealing fit can be carried out by means of a corresponding finishing of the metallic sealing surfaces or using an inserted sealing element. In principle, it is preferred to perform the sealing without a sealing element.

The pressure port P, which is subject to the feed pressure P1, is connected to the housing bore 72 via a pressure channel 78, wherein the pressure channel 78 opens into the housing bore 72 in the area between the sealing collar 66 and the annular collar 64. An annular chamber 80 in the area between the annular collar 64 and the sealing collar 66 is formed from the inner peripheral surface of the housing bore and the outer circumference of the valve bushing 30, the annular chamber being sealed off from the spring chamber 76 by way of the annular collar 64 on the valve seat side. This annular chamber 80 is subject to the feed pressure P1. The annular chamber 80 is connected to the valve bore 32, inside of which the valve body 34 is slidably guided axially, via the radial bore 44. This bore enters approximately in the area of the annular groove 42 of the valve body 34. Accordingly, the annular chamber delimited by the annular groove 42 is also subject to the feed pressure P1. This annular chamber is connected to the annular control chamber 48 via the flattened section 46, which proceeds to the right in the illustration according to FIG. 3, so that the control chamber is also subject to the feed pressure. As discussed above, the valve body 34 is biased in the closing direction by the force resulting from the pressure exerted on the annular end surface 50. The annular end surface corresponds to the difference in surface area of the seating surface area A1 and the end surface area A2 (reference numeral 54) which is at a distance therefrom.

The control port X is connected to the housing bore 72 via a control channel 82, wherein the tank channel 82 opens into an area between the sealing collar 66 and the end section of the valve bushing 30, said section designed with the outer threading 62. This end section of the valve bushing 30 is provided with the reference sign 83 in FIG. 3 and protrudes to the right (view according to FIG. 3) from the housing 70 so that insertion of the cartridge-shaped valve bushing 30 is facilitated. The sealing is carried out via a sealing ring 84 which is arranged between a shoulder of the end section 83 of the valve bushing 30 and a corresponding receptacle of the housing 70.

The sealing collar 66 and the end section 83 designed with the outer threading 62 delimit an annular control chamber 86 into which the control channel 82 opens. This control chamber 86 is connected to the control chamber 56 of the valve bushing 30 via the angular radial channel 58. Accordingly, the end surface 54 having the surface area A2 is subject to the control pressure in effect at the outlet of the pressure-reducing valve 24. As explained above, because the pressure-reducing valve 24 is subject to the feed pressure on the inlet side, this control pressure may be in a range between the feed pressure and the tank pressure, depending on the setting of the pressure-reducing valve.

In regular operation of the axial piston pump 1, when an end user is actuated, the feed pressure should be limited to the preset value of, for example, 20 to 30 bar by the pressure relief valve assembly 20. The pressure-reducing valve 24 is then set to its base position (the proportional solenoid 60 is not energized) so that only the tank pressure is in effect in the control chamber 56. Thus, in this operating state the force on the valve body 34 is in the closing direction due to the force of the spring 36 as well as the tank pressure in effect in the spring chamber 76, whereas the feed pressure P1 in effect in pressure channel 78 acting on the annular end surface 50 and the tank pressure acting on the end surface 54 (in the control channel 82) act in the opening direction. If the forces acting on the valve body 34 in the opening direction exceed the forces acting in the direction of closing, the valve body 34 is lifted off from the valve seat 38 against the force of the spring 36 according to FIG. 4 such that pressure medium can flow out from the pressure channel 78 to the tank channel 74 until the feed pressure again reaches the pressure equivalent substantially corresponding to the force of the spring 36 (e.g., 20 bar to 30 bar), the valve body 34 returning to its closed position accordingly.

If no end user is actuated via the axial piston pump 1, the feed pressure can be lowered via the pressure relief valve assembly 20 to a lower value of, for example, 10 bar, so that the idle operation of the axial piston pump 1 is enabled with reduced energy expenditure.

For this purpose, the pressure-reducing valve 24 is actuated by energizing the proportional solenoid 60 such that a pressure P2 is in effect in the control channel 82, which is correspondingly greater than the tank pressure and can at maximum correspond to the feed pressure. According to the illustration in FIG. 5, the control pressure P2 then acts on the end surface 54 of the valve body 34, which has surface area A2, such that it is subject to a force F2 in the opening direction in accordance with FIG. 5. The feed pressure P1, in effect in pressure channel 78 and acting on the annular end surface 50, acts in the same direction—as explained in FIG. 4. This annular end surface 50 has a surface area which corresponds to the surface area difference A1-A2. Accordingly, due to the force F1 resulting therefrom, the valve body 34 is also acted upon in the opening direction.

Figure 4:
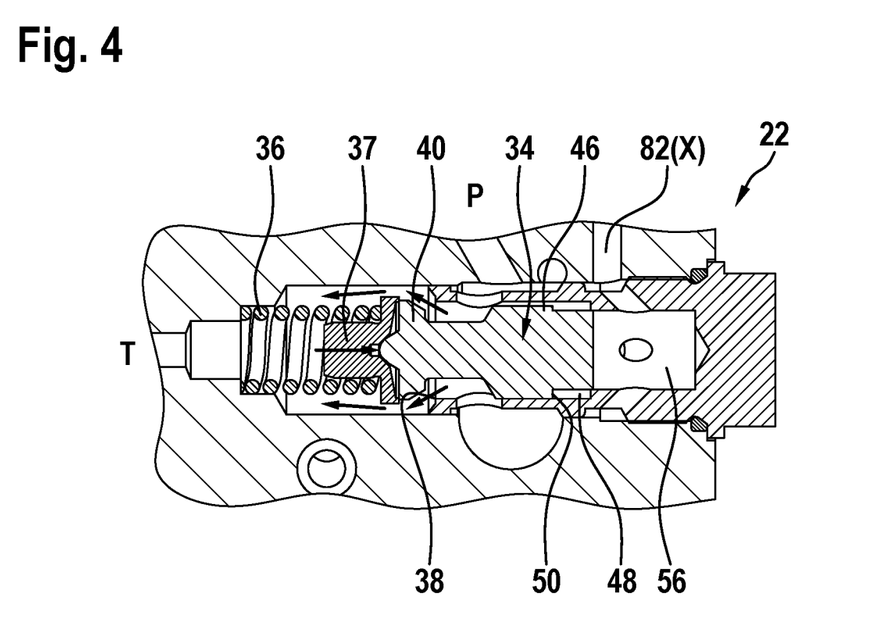
In FIG. 4, the pressure relief valve according to FIG. 3 when the preset maximum feed pressure has been reached.
Figure 5:
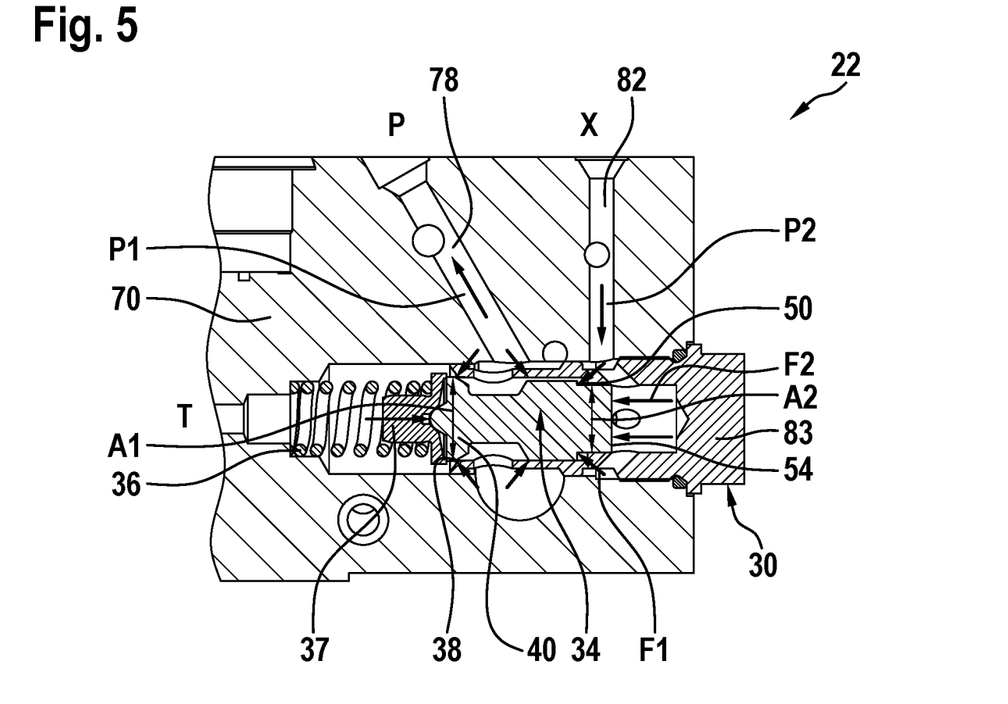
In FIG. 5 the pressure relief valve according to FIG. 3 at a setting for reducing the maximum feed pressure; and In FIG. 6 a variant of a pressure relief valve having an adjustable spring bias.

Simply stated, compared to the actuation according to FIG. 4, in regular operation of the axial piston pump 1, the pressure relief valve 22 is actuated at a lower feed pressure, wherein the reduction corresponds to the additional force, acting on the valve body 34, resulting from the control pressure P2 acting on the end surface 54.

Figure 6:
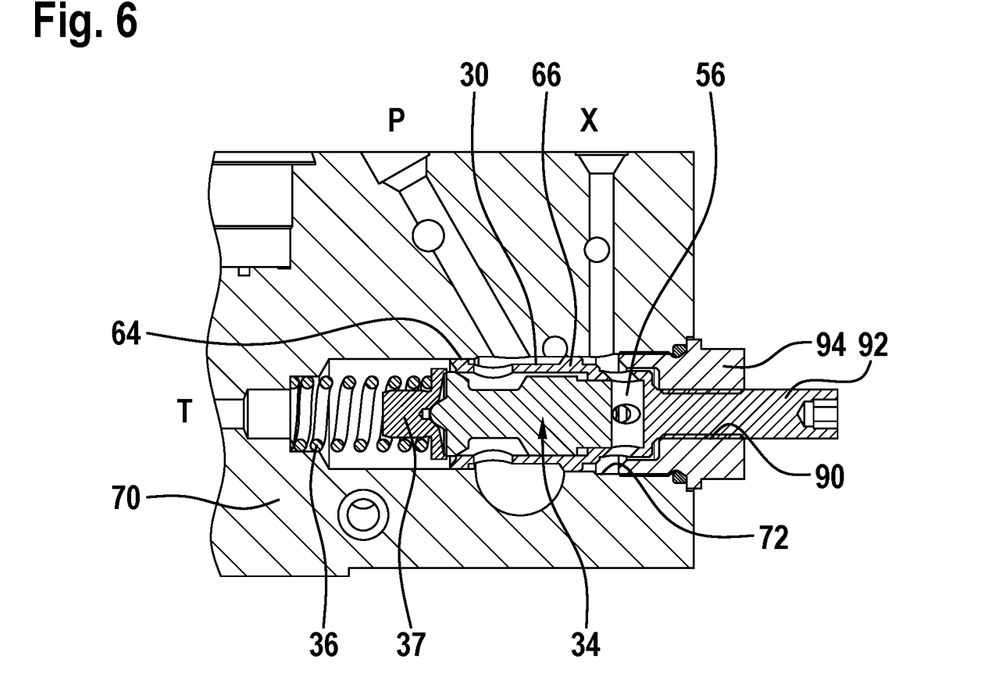

In the exemplary embodiment described above, the closing force of the spring 36 is set to a fixed value. FIG. 6 shows an exemplary embodiment in which the biasing of the spring 36 is designed to be variable. This variability can be achieved very easily by replacing the integral valve bushing 30, as explained in FIGS. 2 to 5, with the variant shown in FIG. 6 wherein the other components of the pressure relief valve assembly 20, such as the housing 70, the spring 36, the spring retainer 37, and the valve cone 40, remain unchanged.

In the exemplary embodiment according to FIG. 6, the end section 83 of the valve bushing 30 projecting from the housing 70 is radially stepped down, wherein a female threading 90 is formed on the bushing, an adjusting portion 92 connected thereto protruding from the housing 70. The female threading 90 is in threaded engagement with a threaded bushing 94 whose outer geometry corresponds approximately to that of the end section 83 of the valve bushing 30 described above. Accordingly, this threaded bushing 94 is screwed into the housing bore 72 in a sealing manner so that its position is not variable. The axial position of the valve bushing 30 can then be changed by attaching a tool to the adjusting portion 92, wherein the relative axial position of the valve bushing 30 can be changed relative to the threaded bushing 94 by way of the threaded engagement, and thus the spring biasing of the spring 36 can be increased or decreased accordingly. The threaded engagement between the threaded bushing 94 and the female threading 90 may be designed as a self-inhibiting fine threading to improve the accuracy of the position, wherein the axial position (spring biasing) then selected can be fixed positionally by attaching a lock nut (not shown) to the protruding adjusting portion 92.

The function otherwise corresponds to that of the above-described exemplary embodiment, so further explanations are unnecessary.

By the exemplary embodiment according to FIG. 6, a collection is provided, so to speak, in which by simply replacing an integral valve bushing 30 (FIGS. 2 to 5) with the multi-part valve bushing of FIG. 6 (valve bushing 30 and threaded bushing 94), the pressure relief valve assembly 20 is then variably adaptable to different operating conditions of use without the need for significant conversion or redesign.

Disclosed are a pressure relief valve assembly, a modular pressure relief valve assembly, and a hydraulic control assembly having such a pressure relief valve assembly which has a very simple design, it being possible optionally to provide a variant having an adjustable spring by replacing a valve bushing.

LIST OF REFERENCE SIGNS

1 Axial piston pump
2 Feed pump
4 Drive shaft
6 Displacement cylinder
8 Displacement valve
10 Working line
12 Working line
14 Primary pressure relief valve
16 Primary pressure relief valve
18 Feed line
20 Pressure relief valve assembly
22 Pressure relief valve
24 Pressure-reducing valve
26 Pressure cut-off valve
28 Switching valve
30 Valve bushing
32 Valve bore
34 Valve body
36 Spring
37 Spring retainer
38 Valve seat
40 Valve cone
42 Annular groove
44 Radial bore
46 Flattened section
48 Annular control chamber
50 Annular end surface
52 End section of valve body 54 End surface
56 Control chamber
58 Radial channel
60 Proportional solenoid
62 External threading
64 Annular collar on the seat side
66 Sealing collar
68 Bottom
70 Housing
72 Housing bore
74 Tank channel
76 Spring chamber
78 Pressure channel
80 Annular chamber
82 Control channel
83 End section of valve bushing
84 Sealing ring
86 Control chamber
90 Female threading
92 Adjusting portion
94 Threaded bushing

The invention claimed is:

1. A pressure relief valve assembly comprising:
a pressure relief valve comprising:
a valve bushing received in a valve bore of a housing bore;
a valve body biased against a valve seat by a spring that is guided in said valve bushing, the valve body including a first control surface subjected, in an opening direction, to a pressure to be limited, and a second control surface subjected to a control pressure in the opening direction,
wherein an axial support of the valve bushing in the housing bore is provided by a fixing device disposed on the valve bushing,
wherein the valve bushing has a radially protruding sealing collar which sealingly sits against a peripheral wall of the housing bore and which seals an annular chamber carrying the pressure to be limited against an annular control chamber carrying the control pressure, and
wherein both the annular chamber and the annular control chamber are delimited in a radial direction, at least in sections, on one side by the housing bore and on another side by the valve body.

2. The pressure relief valve assembly according to claim 1, wherein the annular control chamber is in pressure communication with a second control chamber, which is at a distance away from the valve seat and is delimited by the second control surface.

3. The pressure relief valve assembly according to claim 2, wherein first control surface is formed by an annular end surface of the valve body.

4. The pressure relief valve assembly according to claim 1, wherein:
an annular groove is defined in the valve body, the annular groove having lateral surfaces configured with the same end surface area, and subjected to the pressure to be limited, and
an annular control chamber delimited by the first control surface is connected to the annular groove via a flattened section of the valve body.

5. The pressure relief valve assembly according to claim 1, wherein the valve bushing has a radially protruding annular collar which sits sealingly against the peripheral wall of the housing bore, the valve seat being formed on said annular collar.

6. The pressure relief valve assembly according to claim 5, wherein each of the sealing collar and the annular collar is designed with metallic sealing surfaces or is sealed using a sealing element.

7. The pressure relief valve assembly according to claim 1, further comprising:
a pressure valve configured to adjust the control pressure.

8. The pressure relief valve assembly according to claim 7, wherein the pressure valve is a pressure-reducing valve.

9. The pressure relief valve assembly according to claim 1, wherein the valve bushing is configured to be axially moved in the housing bore to adjust biasing provided by the spring.

10. The pressure relief valve assembly of claim 9, wherein the fixing device has a threaded bushing fixed in the housing bore, the threaded bushing being in threaded engagement with the valve bushing.

11. The pressure relief valve assembly according to claim 10, wherein an adjusting portion of the valve bushing sealingly penetrates and protrudes out from the threaded bushing.

12. The pressure relief valve assembly according to claim 1, wherein the fixing device includes a threaded portion of the valve bushing.

13. A modular pressure relief valve assembly for selectively configuring a constant spring bias or a variable spring bias pressure relief valve having a constant spring biasing or a variable spring biasing, comprising:
a pressure relief valve comprising:
a valve body biased against a valve seat by a spring, the valve body guided in one of a valve bushing and a further valve bushing, the valve body including a first control surface subjected, in an opening direction, to a pressure to be limited, and a second control surface subjected to a control pressure in the opening direction,
the valve bushing configured to be axially moved in a valve bore of a housing bore to adjust the variable spring biasing; and
the further valve bushing has an external threading integral with said further valve bushing, the external threading being designed for screwing into the housing bore,
wherein an axial support of the one of the valve bushing and the further valve bushing in the housing bore is provided by a fixing device disposed on the valve bushing,
wherein the one of the valve bushing and the further valve bushing has a radially protruding sealing collar which sealingly sits against a peripheral wall of the housing bore and which seals an annular chamber carrying the pressure to be limited against an annular control chamber carrying the control pressure, and
wherein both the annular chamber and the annular control chamber are delimited in a radial direction, at least in sections, on one side by the housing bore and on another side by the valve body.

14. The modular pressure relief valve assembly according to claim 13, wherein the valve bushing and the further valve bushing are provided with structurally identical valve bodies, spring assemblies, and housing bores which can be assembled to form the modular pressure relief valve assembly.

15. A hydraulic control assembly comprising:
an axial piston machine guided in a closed circuit; and
a pressure relief valve assembly comprising:
- a pressure relief valve comprising:
    - a valve bushing received in a valve bore of a housing bore;
    - a valve body biased against a valve seat by a spring, the valve body guided in said valve bushing, the valve body including a first control surface subjected, in an opening direction, to a pressure to be limited, and a second control surface subjected to a control pressure in the opening direction,
- wherein an axial support of the valve bushing in the housing bore is provided by a fixing device disposed on the valve bushing,
- wherein the valve bushing has a radially protruding sealing collar which sealingly sits against a peripheral wall of the housing bore and which seals an annular chamber carrying the pressure to be limited against an annular control chamber carrying the control pressure,
- wherein both the annular chamber and the annular control chamber are delimited in a radial direction, at least in sections, on one side by the housing bore and on another side by the valve body, and
- wherein the pressure relief valve assembly is configured to set a feed pressure of the axial piston machine.

\* \* \* \* \*